(12) United States Patent
Duran et al.

(10) Patent No.: US 7,951,294 B2
(45) Date of Patent: May 31, 2011

(54) OIL AND DEBRIS SEPARATOR

(76) Inventors: Lee A. Duran, Lyme, CT (US); Thomas J. Mullen, III, Middle River, MD (US)

( * ) Notice: Subject to any disclaimer, the term of this patent is extended or adjusted under 35 U.S.C. 154(b) by 3 days.

(21) Appl. No.: 12/355,385

(22) Filed: Jan. 16, 2009

(65) Prior Publication Data
US 2010/0181237 A1 Jul. 22, 2010

(51) Int. Cl.
*B01D 21/24* (2006.01)
(52) U.S. Cl. .............. 210/170.03; 210/532.1; 210/538
(58) Field of Classification Search .................. 210/154, 210/162, 163, 164, 170.03, 532.1, 532.2, 210/538, 539, 540
See application file for complete search history.

(56) References Cited

U.S. PATENT DOCUMENTS

| | | | | |
|---|---|---|---|---|
| 140,145 A * | 6/1873 | Ledbeter | ..................... | 210/532.1 |
| 1,401,182 A * | 12/1921 | Overton | ..................... | 210/532.2 |
| 1,634,871 A * | 7/1927 | Hepler | ........................... | 210/538 |
| 1,769,340 A * | 7/1930 | Gutman et al. | ................ | 210/539 |
| 4,334,991 A * | 6/1982 | Beede | ......................... | 210/532.2 |
| 4,985,148 A * | 1/1991 | Monteith | .................... | 210/532.1 |
| 6,126,817 A | 10/2000 | Duran et al. | | |
| 6,350,374 B1 * | 2/2002 | Stever et al. | ............. | 210/170.03 |

* cited by examiner

*Primary Examiner* — Christopher Upton
(74) *Attorney, Agent, or Firm* — St. Onge Steward Johnston & Reens LLC

(57) ABSTRACT

A hood for mounting over an outlet in a wall of a catch basin is disclosed. The hood includes a hood wall that forms a prow in a horizontal plane. The prow extends along an axis of the hood thereby achieving optimal flow conditions in the catch basin. In some embodiments the hood wall is shaped to be at least partially sealably mounted to the interior wall of a catch basin have a circular cross section in a horizontal plane. This novel hood shape facilitates installation of the hood in the circular catch basin, while also reducing the flow of oil and other pollutants into the outlet pipe in the circular catch basin. In some embodiments a perforated screed is also disclosed that surrounds the hood to aid in the capture of floatable pollutants.

19 Claims, 9 Drawing Sheets

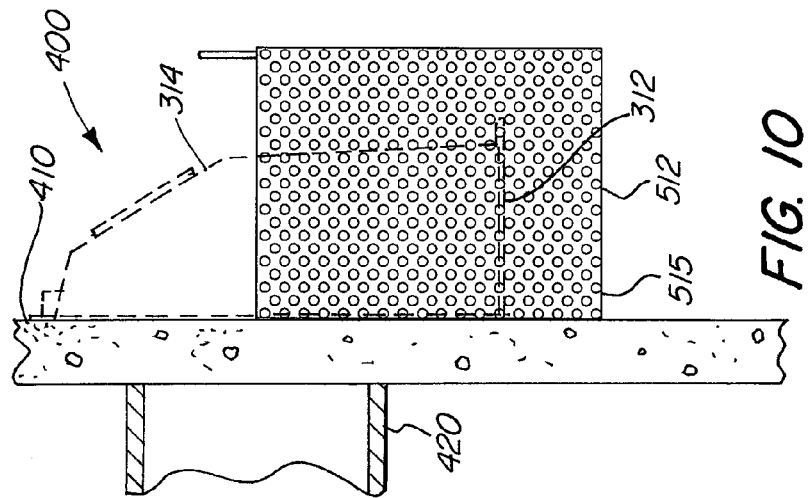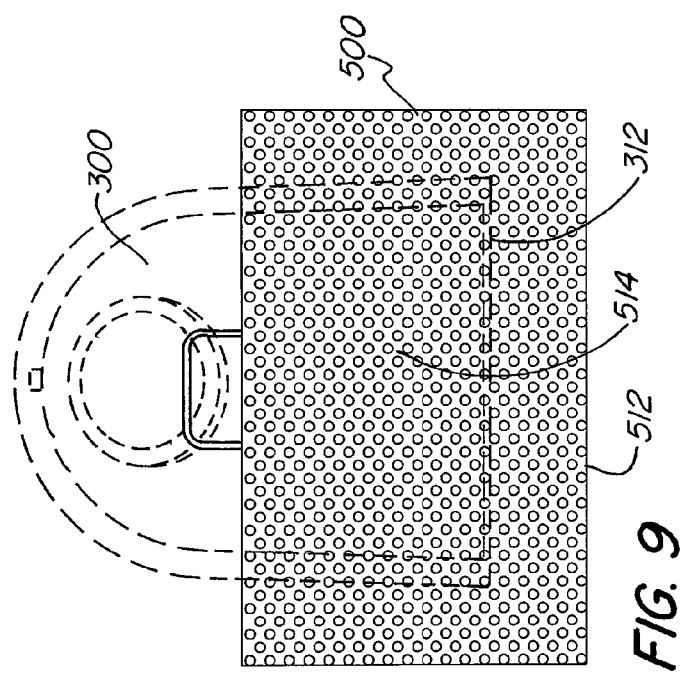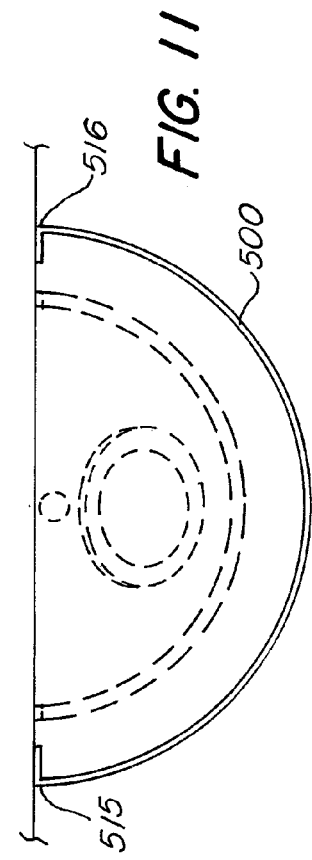

OIL AND DEBRIS SEPARATOR

FIELD OF THE INVENTION

The present invention relates to the field of wastewater management. More particularly the present invention relates to a low cost and effective apparatus for controlling and reducing the flow of pollutants and solids into an outlet of a catch basin.

BACKGROUND OF THE INVENTION

Stormwater runoff is characterized by the United States Environmental Protection Agency as one of the greatest remaining sources of water pollution in America. Thus, efforts to implement stormwater quality improvement regulations are accelerating across the United States, compelling municipalities and land developers to maximize the usefulness and effectiveness of stormwater infrastructure as never before.

In urban, suburban, and commercial settings polluted stormwater, also referred to wastewater, is often collected in a catch basin, also referred to as a wastewater basin. In its simplest form, a catch basin functions to intercept surface water flows in order to prevent the accumulation of stormwater in an area where flooding could impede traffic or pedestrians, cause property damage, or otherwise present a nuisance. Stormwater collects in the catch basins, and flows through a network of pipes, sewers, and additional catch basins to an outlet point such as a lake, stream, river, ocean, unpopulated area, or similar location where the wastewater may be dispersed without the threat of flood or property damage. However, catch basins are also often the entry point of pollutants from diffuse sources found in stormwater runoff. For example stormwater runoff may contain pollutants such as hydrocarbons (also referred to as "oil"), bacteria, sediment, trash, organic material such as leaves, grass clippings, particulate, soil, detergents, coolants, grease, fertilizer, paint, and feces. As a result, polluted wastewater is often discharged untreated, directly into lakes, streams, and oceans.

As discussed in U.S. Pat. No. 6,126,817 to Duran et al., which is hereby incorporated by reference, many types of equipment and processes have been suggested in the past for reducing the level of pollutants in wastewater. Many of these systems are based on the principle of differential specific gravity separation. The liquid mixture, which usually is wastewater, flows slowly through an elongated path in a liquid-retaining structure, such as, for example, a catch basin. The matter to be collected is usually oil and floatable debris, both of which accumulate on the surface of the wastewater because they have a specific gravity lower than that of water. Alternatively, as the wastewater flows through the catch basin solids carried by the wastewater accumulate on the bottom of the basin. These solids sink to the bottom of the catch basin because they have a specific gravity greater than water.

U.S. Pat. No. 6,126,817 discloses an outlet hood (or "hood") for use in a catch basin to reduce the flow of oil and other pollutants into an outlet, also referred to as an outlet pipe, in the catch basin. The hood is useful for capturing trash and floatables, and modest levels of free oils, and sediment. The hood is sealably mounted to the wall of a catch basin over the outlet pipe in the wall of the catch basin. The hood is mounted such that the bottom of the hood extends below the lowest level of the outlet. As wastewater collects in the catch basin heavier pollutants sink and collect on the bottom of the catch basin in the sump, the area below the outlet. Other pollutants having a specific gravity less than water, such floatables and oil, float on the surface of the wastewater.

The bottom of the hood prevents pollutants with a specific gravity lower than water from entering the outlet pipe since the bottom of the hood extends below the static water level of the wastewater that accumulates in the catch basin. As the wastewater level rises in the catch basin, water flows underneath the bottom of the hood, which is below the surface of the water, and into the outlet pipe. Pollutants with a specific gravity lower than water, however, remain on the surface of the wastewater. The wall of the hood acts as a barrier and prevents the oil and other floatables from flowing into the outlet pipe. Periodically, the catch basin is cleaned to remove oil and other floatables that have accumulated therein, as well as sediment that has accumulated in the bottom of the catch basin. In this way the hood provides an inexpensive means of reducing the level of pollution in wastewater.

It is known to manufacture an outlet hood by casting or molding a continuous hood from cast iron or fiberglass. The molded hood can be, at least partially, sealably mounted to the wall of a catch basin over an outlet pipe. In some catch basins the outlet pipe protrudes from the wall of the catch basin some distance. The length of the protrusion from the wall varies in each catch basin. Therefore, it is preferred that a single hood can be used in catch basins having varying outlet pipe configurations.

In reference to FIG. 1, a known outlet hood 10 is shown. The hood 10 is installed to the wall 20 of a catch basin over an outlet pipe 30 in the wall 20 of the catch basin. The outlet pipe 30 is shown with hidden lines and its distal end appears to protrude slightly from the wall 20 of the catch basin.

The bottom 12 of the hood 10, shown in FIG. 1, is open. The top 18 and sides 15, 16 of the hood 10 are sealably mounted to the wall 20 of the catch basin. The front of the hood bulges outwardly from the wall 20 of the catch basin. The installed hood 10 forms a hood compartment defined by the wall 20 of the catch basin and the hood 10. Wastewater that accumulates in the catch basin flows under the bottom barrier 12 of the hood 10 and into the hood compartment where it is drawn into the outlet pipe 30. The static water level in the catch basin, i.e. the water level in the catch basin when the net flow fluid through the basin is zero, is defined by the bottom level of the outlet pipe 32. After the hood is installed the surface of the wastewater consists of two distinct areas: (1) the area of the surface wastewater inside the hood compartment, and (2) the area of the surface wastewater outside the hood compartment.

The front and sides 15, 16 of the hood 10 comprise a hood wall 14 that is curved in the horizontal axis and extends along a vertical axis. In known hood 10 designs the curvature of the hood wall 14 is substantially constant. For example, in a cross section plane defined by the static water level in the catch basin the hood wall 14 is substantially a semicircle with a constant radius. This curved shaped extends along the vertical axis of the hood. Both ends of the semicircle 15, 16 are sealably mounted to the flat catch basin wall 20 thereby defining the distinct area of the surface wastewater inside the hood compartment.

The upper portion or top 17 of the hood 10 comprises a semispherical closure as shown in FIG. 1. In known hoods the semispherical closure, or dome 17, has a constant radius equal to that of the curved hood wall 14. The ends of the semispherical dome 17 are sealably mounted to the wall 20 of the catch basin. The dome 17 may include a vent hole or vent pipe, or, as shown in FIG. 1, may be completely sealed. It is preferred that the semispherical dome 17 is sealably mounted to the wall 20 to prevent oil, pollutants, and other floatables that accumulate on the surface of the wastewater from flowing over a top of the hood wall 14 and into the outlet pipe 30, especially during high flow events, when the level of the wastewater rises in the catch basin.

The hood wall 14 is semicircular in the cross section plane defined by the static water level 32 in the catch basin. This constant curvature allows the hood 10 to fit over an outlet pipe 30 that protrudes from the wall 20 of the catch basin, while at the same time provides clearance for wastewater to flow under the bottom 12 of the hood 10 and into the outlet 30.

A disadvantage of known hoods is that they do not efficiently facilitate precipitation of particulate suspended in the wastewater flowing through the catch basin.

Another disadvantage of known hoods is that they do not increase the distance of the flow path of wastewater flowing through the catch basin system, thereby facilitating precipitation of particulate suspended in the wastewater flowing through the catch basin. The ability of solids to stay suspended in wastewater is a function of the energy in the flow path and the settling velocity of the solid particles. Assuming the characteristics of the particles are constant, the goal is to remove as much energy in the flow path as is feasible, thus allowing for particles to settle and flow to continue as required by a given drainage structure (e.g. stopping flow altogether is optimal in terms of settling, but not in terms of a structure still functioning as a drainage facility). The longer the flow path, the more energy that is dissipated over that path and the more solids that will settle out of the wastewater.

Another disadvantage of known hoods is that they do not create multiple flow paths in a laminar fashion to increase the flow path of more rapidly accumulate on the surface of the wastewater outside the hood compartment. With less surface area outside the hood compartment, oil and other pollutants that accumulate on the surface of the water and are more susceptible to being drawn under the hood and into the outlet pipe, especially as the level of pollutants increases, before they can be emptied from the catch basin by service personnel.

Another disadvantage of known hoods is that their ability to prevent oil and other pollutants from flowing under the bottom of the hood and into the outlet pipe decreases as the ratio of the area of the surface water inside the hood compartment to the area of the surface water outside the hood compartment increases. This problem commonly occurs in catch basins having circular cross section in the horizontal plane.

Another disadvantage of known hoods and hood shapes is that they do not prevent ice from forming on the surface of the wastewater outside the hood compartment and proximate to the bottom of the hood.

Another disadvantage of known hoods is that they are susceptible to structure failure in high flow conditions, especially when used in catch basins having a circular cross section. In catch basins having relatively small cross sections water enters at higher velocities. This high rate of flow exerts direct pressure on the hood. Known hoods are susceptible failure under these conditions because they the side of the hood wall are not perpendicular with the circular wall of the catch basin.

Another disadvantage of known hoods is they are not provided with an apparatus that prevents floatables and other debris inadvertently drawn under the bottom barrier of hood from entering the outlet. wastewater flowing through the catch basin and increase the settling ability of the drainage structure.

Another disadvantage of known hoods is that they do not induce a hydraulic wedge in wastewater that flows into the catch basin, thereby inducing two laminar counter-cyclic eddies, both creating a longer flow path than in known outlet hoods. As wastewater is directed toward the known hood in the catch basin the known hood does not efficiently increase the length of the flow path of the wastewater flowing through the system.

Another disadvantage of known hoods is that they do not induce an increased laminar flow path in wastewater that enters the basin and flows toward the circular front wall of the hood.

Another disadvantage of known hoods is that they are difficult to install in circular catch basins (circular in the horizontal plane), especially in catch basins having a relatively small diameter, because there is insufficient space for personnel to sealably mount the hood to the wall of the catch basin due to the curvature of the front of the hood and the curvature of the catch basin wall.

Another disadvantage of known hoods is that they cannot be used in a catch basin having a relatively small cross sectional area and relatively large outlet pipe.

Another disadvantage of known hoods is that their ability to prevent oil and debris from flowing under the bottom of the hood and into the outlet pipe decreases with a larger hood compartment (i.e. hood wall having a larger constant radius). A larger hood compartment occupies a greater area of the water surface in the catch basin. This in turn reduces the area on the water surface outside the hood compartment causing oil and pollutants to Another disadvantage of known hoods is that they are increasingly difficult to mold from fiberglass or form from metal or plastic as the size of the hood increases. As the dimensions of the hood increase the molding produces a less consistent shape, thereby increasing production costs, and limiting the strength of the outlet hood.

What is desired therefore is an apparatus for reducing the flow of pollutants such as hydrocarbons, sediment, soil, trash, and floatables into the outlet of a catch basin. Another desire is such an apparatus that can be used in a catch basin that has a circular cross section, and a relatively small diameter. Another desire is an apparatus that extends along an axis, and has a wall shaped to partially sealingly fit around the outlet of an interior wall of a catch basin so as to define at least a partially sealable compartment therewith that is open to the outlet and extends below the outlet so that waste materials floating on said water mixture outside of the compartment are prevented from entering said outlet, wherein the wall forms a prow in a cross section plane being defined by a static water level in said catch basin.

SUMMARY OF THE INVENTION

It is therefore an object of the present invention to provide an apparatus for retaining and/or absorbing pollutants in wastewater that flows through a catch basin.

It is another object of the present invention to provide a hood, and more specifically a novel hood wall, that efficiently facilitates the precipitation of particulates suspended in the wastewater flowing through the catch basin.

It is another object of the present invention to provide a hood, and more specifically a novel hood wall that creates multiple flow paths in a laminar fashion to increase the flow path of wastewater flowing through the catch basin and increase the settling ability of the drainage structure.

It is another object of the present invention to provide a hood, and more specifically a novel hood wall, that creates a hydraulic wedge in wastewater flowing through the catch basin, thereby inducing two laminar counter-cyclic eddies, both creating a longer flow path than just than in known outlet hoods.

It is another object of the present invention to provide a hood that induces an increased laminar flow path in wastewater that enters the basin and flows toward the circular front wall of the hood.

It is another object of the present invention to provide a hood, and more specifically a novel hood wall, that induces longer dual eddy flow paths in the wastewater that flows through the catch basin.

It is another object of the present invention to provide a hood, and more specifically a novel hood wall, that is easy to install in a circular catch basin. More specifically, it is an object of the present invention to provide a wedge shaped, or prow shaped front hood wall. Although this design reduces the area of the hood compartment, it provides additional area on either side for unobstructed access to the side flanges of the hood for sealably mounting to the curved wall of a catch basin having a circular cross section.

It is another object of the present invention to provide a hood, and more specifically a novel hood wall, that can be used in a catch basin having a rectangular cross section with a relatively small plan area and a relatively large outlet pipe.

It is another object of the present invention to provide a hood, and more specifically a novel hood wall, that can be installed over varying sized outlet pipes, both in diameter and/or length of protrusion from the catch basin wall.

It is another object of the present invention to provide a hood, and more specifically a novel hood wall, that prevents oil and debris from flowing under the bottom of the hood and into the outlet pipe. More specifically, the novel hood wall has a prow, i.e. wedge shape. With this novel shape the hood compartment occupies a lesser area of the water surface in the catch basin compared to a known hood having a curved front wall sized to fit over a similar sized outlet pipe.

It is another object of the present invention to provide a hood, and more specifically a hood having a wedge shaped front wall, wherein the hood wall splits flow in the catch basin thereby reducing the formation of ice in the wastewater.

It is another object of the present invention to provide a hood, and more specifically a hood having a wedge shaped front wall, wherein the hood wall acts to break up ice that flows into the catch basin through an inlet in the catch basin.

It is another object of the present invention to provide a hood, and more specifically a hood having a wedge shaped wall, wherein the hood can be manufactured in multiple separate molds, thereby reducing production and shipping costs, especially for larger sized hoods.

It is another object of the present invention to provide a screen apparatus mounted under and around the bottom of hood, wherein the apparatus prevents floatables and other debris inadvertently drawn under the bottom barrier of hood from entering the outlet.

It is another object of the present invention to provide a hood, and more specifically a hood having a wedge shaped wall, wherein a plurality hoods are securely stackable, thereby reducing shipping and storage costs.

It is yet another object of the present invention to provide a single apparatus that comprises a catch basin and a hood mounted therein, wherein the hood is mounted in the catch basin prior to the catch basin being installed into the ground.

These and other objects of the present invention are achieved through an apparatus comprising a hood, wherein a front wall of the hood is formed in the shape of a prow that extends along an axis, thereby overcoming the problems of the prior art. More particularly, these and other objects of the present invention are achieved via an apparatus that extends along an axis, and has a wall shaped to partially sealingly fit around the outlet of an interior wall of catch basin so as to define at least a partially sealable compartment therewith that is open to the outlet and extends below the outlet so that waste materials floating on said water mixture outside of the compartment are prevented from entering said outlet, wherein the hood wall substantially forms a prow in a cross section plane being defined by a static waterline in said catch basin.

The invention and its particular features and advantages will become more apparent from the following detailed description considered with reference to the accompanying drawings.

BRIEF DESCRIPTION OF THE DRAWINGS

Exemplary embodiments of the invention are explained in more detail in the description which follows and are represented in the drawings, in which:

FIG. 8 further discloses, with hidden lines, the outline of the front wall of a known hood, wherein the curvature of the known hood wall is constant.

FIG. 9 is a front view of a screen apparatus mounted around the bottom of hood.

FIG. 10 is a side view of the screen apparatus shown in FIG. 9.

FIG. 11 is a top view of the screen apparatus shown in FIG. 9.

DETAILED DESCRIPTION OF THE INVENTION

Figure 1A:
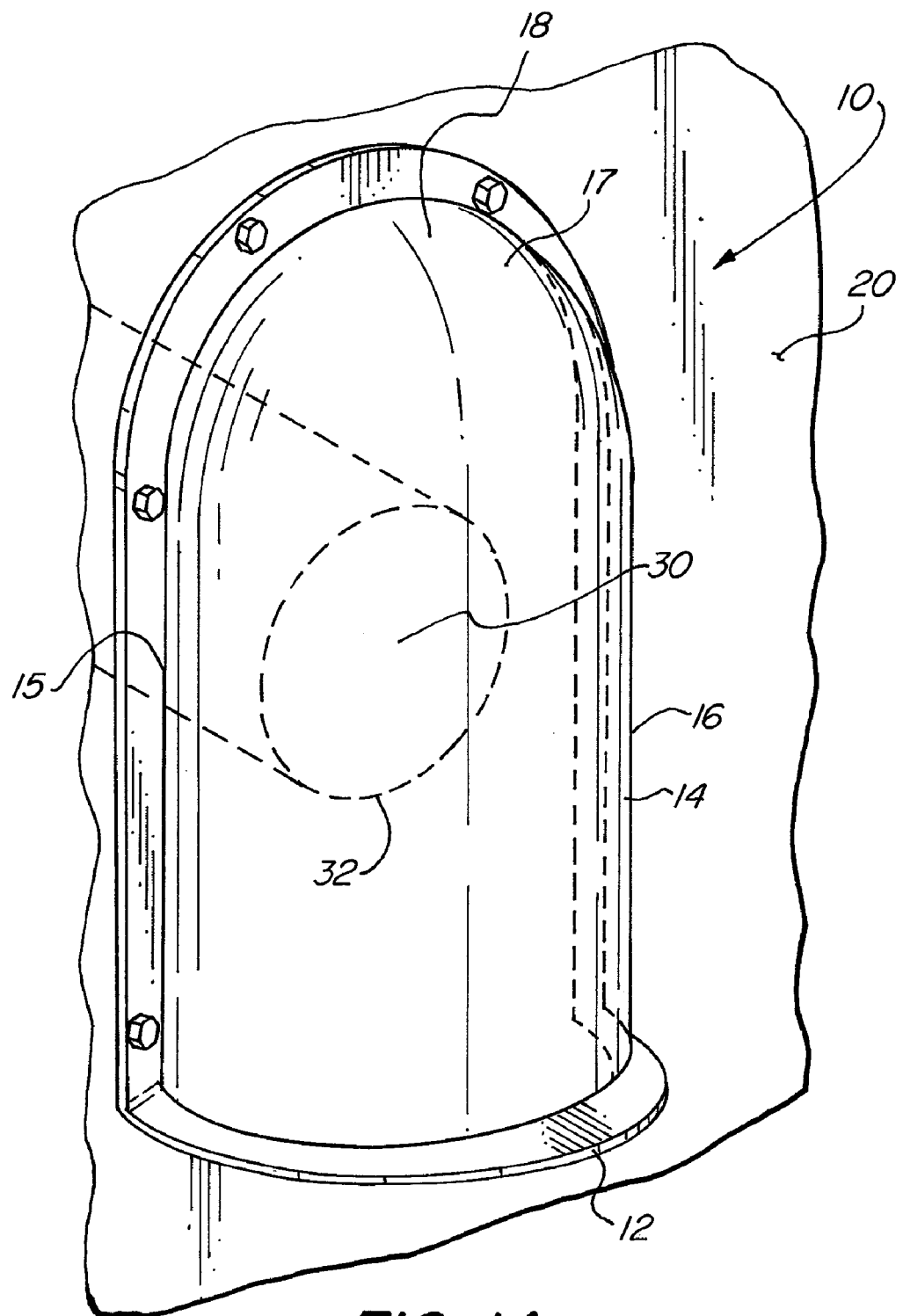
FIG. 1A is a orthogonal view of a catch basin wall, wherein a known hood design having a front wall in the horizontal plane with a constant radius is sealably mounted to the wall of a catch basin over an outlet.

Referring now to the drawings, wherein like reference numerals designate corresponding structure throughout the views.

FIGS. 1B, 2, 3, 4, and 5 illustrate a novel hood 100 wherein the hood wall 114 forms a prow 120 or a wedge 120 that extends along an axis. The hood in FIGS. 1B, 2, 3, 4, and 5 100 comprises a hood wall 114, and hood top 144. The hood wall 114 and the hood top 144 come together to form a continuous hood 100. The perimeter of the hood 100 has a flange 150. The flange 150 provides a surface to sealably mount the hood 100 to the catch basin wall 210. The hood 100 includes a vent 160 to equalize air pressure in hood compartment 102 with the ambient air in the catch basin 200 outside the hood compartment 104. The hood top 144 further includes an access port 162 for accessing the hood compartment 102 after installation. It should be understood that some embodiments of the present invention do not include a vent or vent pipe 160, and in some embodiments the air in the hood compartment 102 is not in communication with the ambient air in the catch basin 200 outside the hood compartment 104. In other embodiments the hood 100 comprises a hood wall 114, and does not include a hood top 144. For example, the hood 100 is open at its top.

Figure 1B:
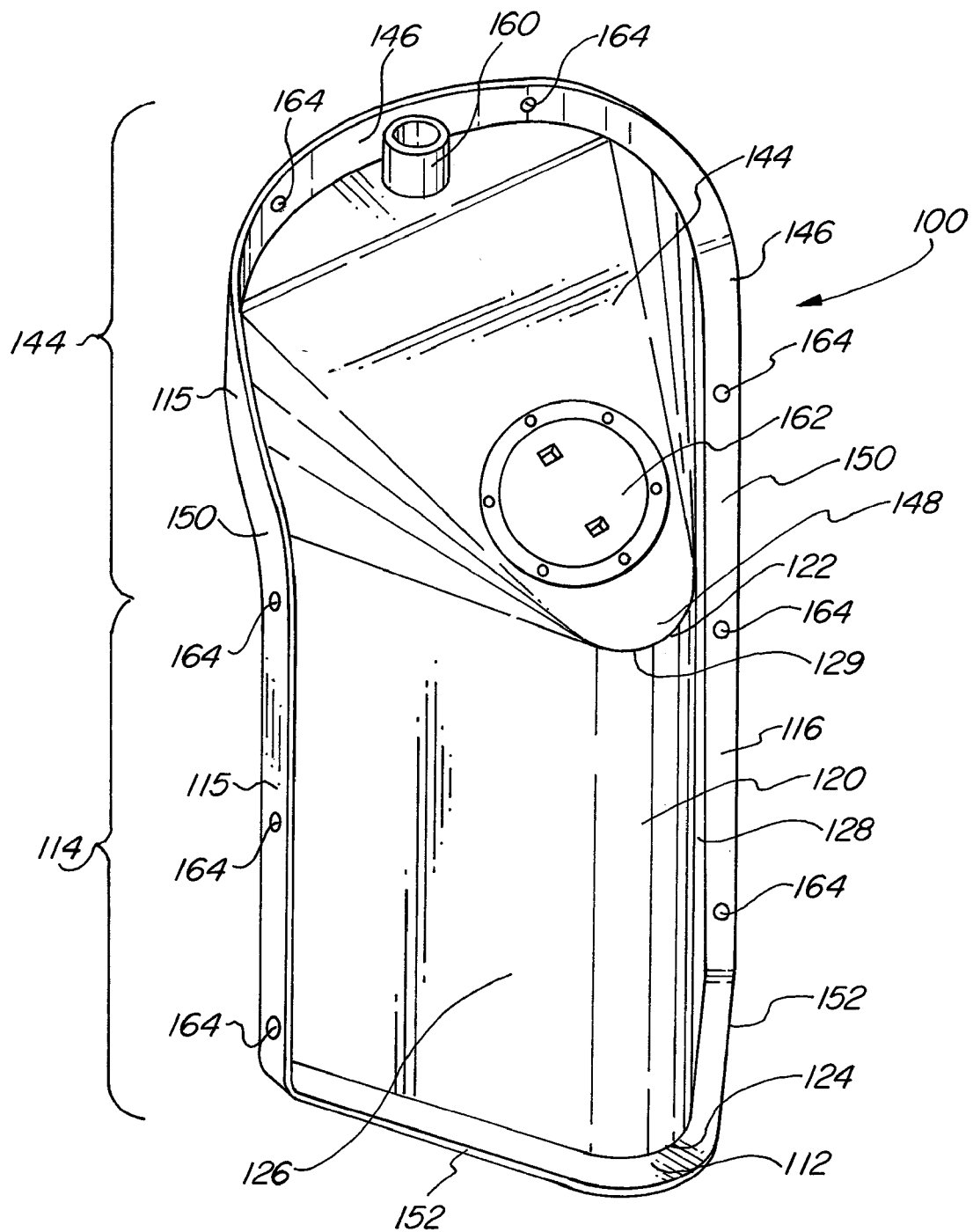
FIG. 1B is an orthogonal view of one embodiment of the novel hood wherein front wall of the hood forms a prow that extends along a vertical axis.
Figure 2:
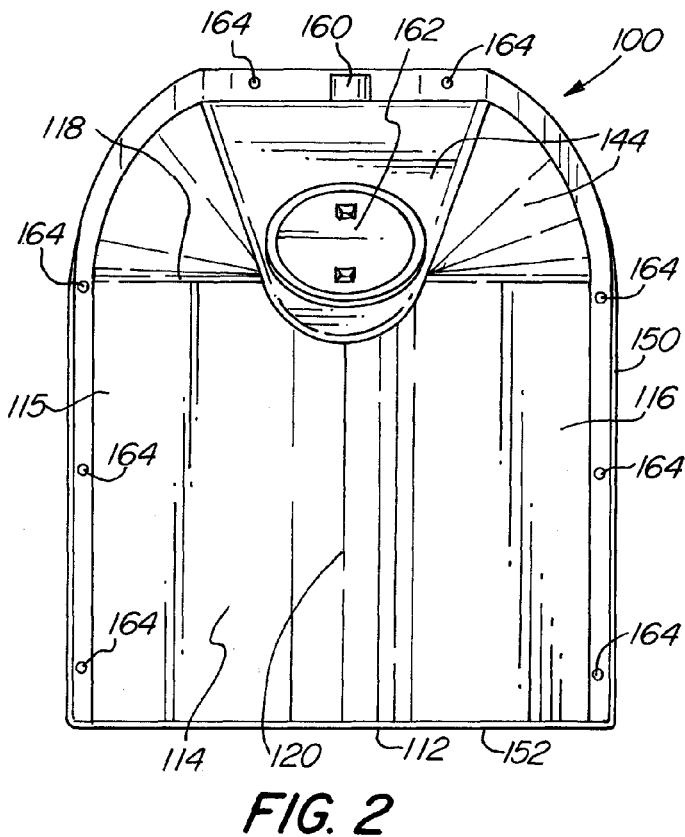
FIG. 2 is a front view of the hood shown in FIG. 1B.
Figure 3:
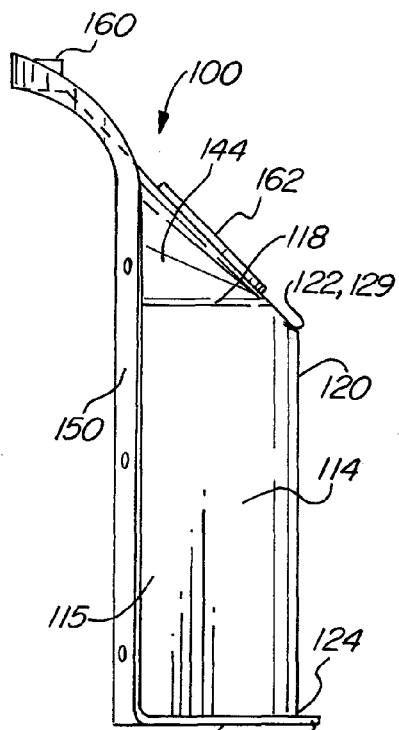
FIG. 3 is a side view of the hood shown in FIG. 1B.

The hood 100 disclosed in FIG. 1B is designed to be sealably mounted to the interior wall 210 of a catch basin 200 having a circular cross section in a horizontal plane. In other embodiments of the present invention the hood 100 is designed to be sealably mounted to the interior wall 210 in a catch basin 200 having a square or rectangular cross section in the horizontal plane. For example against a flat wall.

In reference to FIG. 1B, the hood 100 comprises a hood wall 114. The hood wall 114 extends along a substantially vertical axis. The bottom 112 of the hood wall 114 defines a barrier that prevents oil and other floatables from entering the outlet 220 (note that outlet and outlet pipe are used interchangeably) when the hood 100 is mounted to the catch basin wall 210 and the bottom 112 extends below the lowest point 222 of the outlet 220. In some embodiments, as shown in FIG. 1B the bottom 112 of the hood wall 114 includes a splitter 152 that extends along a least a portion of the bottom 112 of hood wall 114. The splitter 152 extends outward from the hood 100 in the horizontal plane. The splitter 152 provides an efficient barrier to prevent floatables from being drawn under the bottom 112 of the hood 100 by the flow of wastewater 240. For example, if wastewater 240 flows down a surface of the hood wall 114, the splitter 152 interrupts the flow and forces it to circulate around the horizontal splitter 152 at the bottom 112 of the hood wall 114 before it can flow into the hood compartment 102 and outlet pipe 220. This obstruction 152 creates vortices or eddies in the wastewater 240 that jettisons floatables and other pollutants from the wastewater 240 current, to the surface of the wastewater 240 outside the hood compartment 140.

Figure 12:
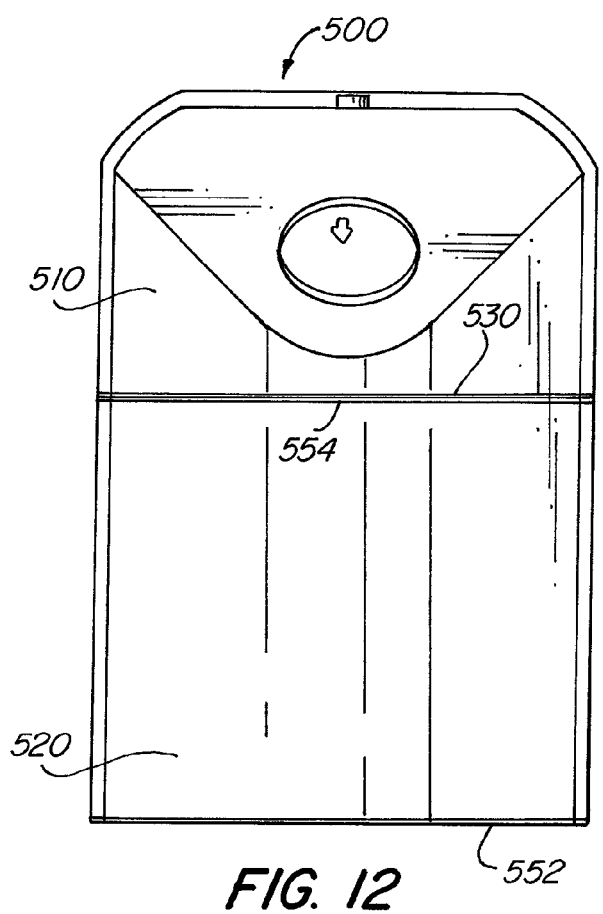
FIG. 12 is a front view of one embodiment of the present invention.
Figure 13:
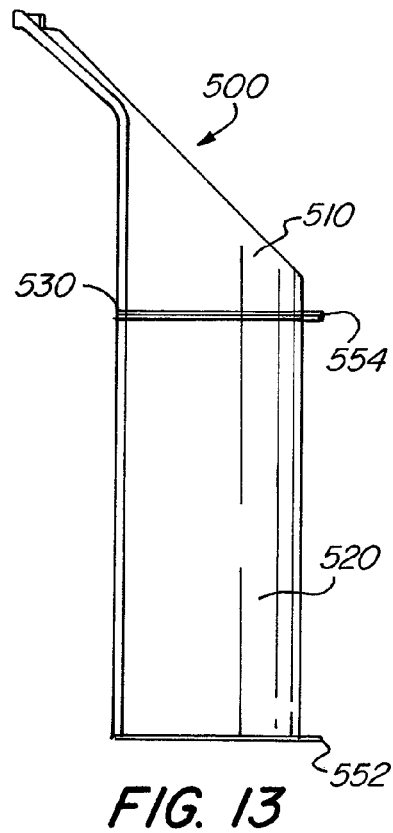
FIG. 13 is a side view of the hood shown in FIG. 12.
Figure 14:
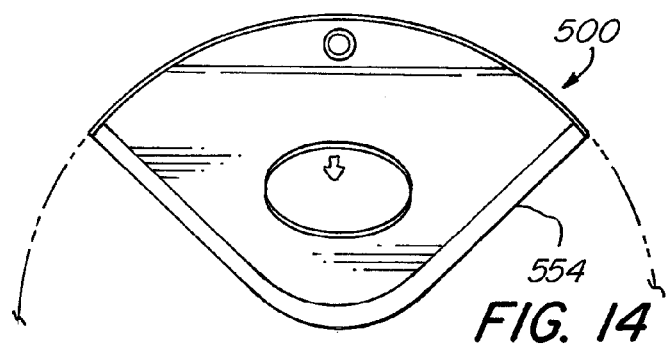
FIG. 14 is a top view of the hood shown in FIG. 12.
Figure 15:
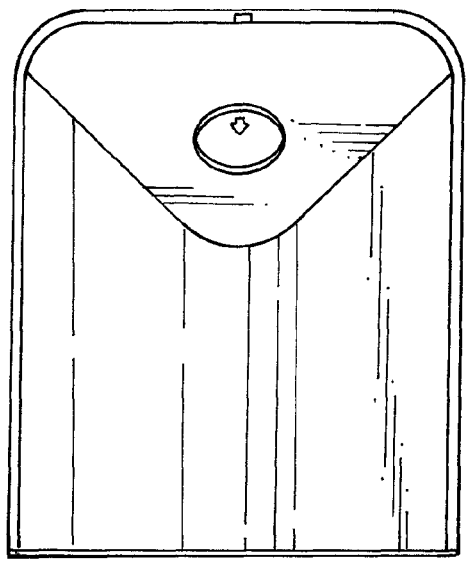
FIG. 15 is a front view of one embodiment of the present invention.
Figure 16:
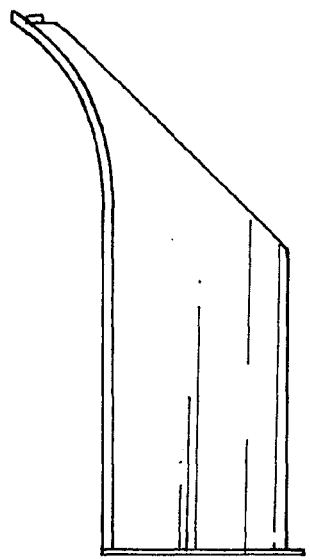
FIG. 16 is a side view of the hood shown in FIG. 14.
Figure 17:
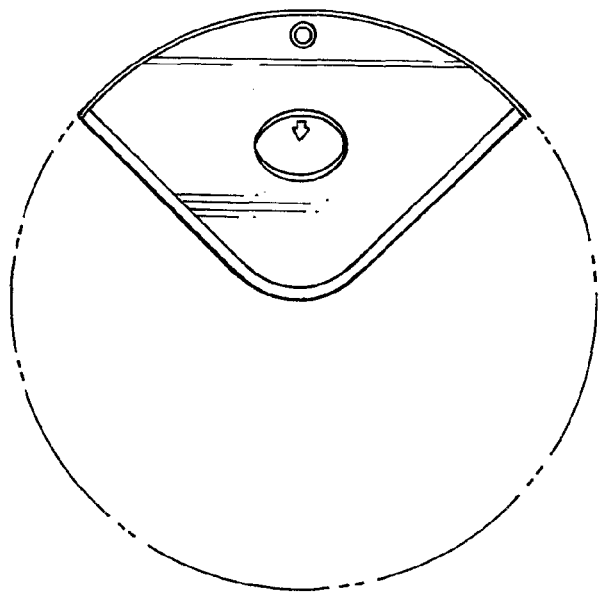
FIG. 17 is a top view of the hood shown in FIG. 14.

In reference to FIGS. 12-14 another embodiment of the inventive hood 500 is shown wherein the front wall comprises a plurality of splitters. The hood comprises two sections, a top section 510 and a bottom section 520. Each section 510, 520 is formed in a separate mold, as discussed below. The hood 500 is similar in shape to that discussed in the above paragraph. The hood 500 further includes a second splitter 554 that extends along at least a portion of the hood wall at juncture 530 of the top section 510 and bottom section 520. The second splitter 554 provides an efficient barrier to prevent floatables from being drawn under the bottom of the hood by the flow of wastewater 240. The second splitter 554 works in combination with the first splitter 552 to increase the efficiency of the present invention. It should be understood that in some embodiments of the present invention there are additional splitters on the front wall of the hood.

In further reference to FIG. 1B, the hood wall 114 further comprises a left side 115 and right side 116. A flange 150 extends along a least a portion of the perimeter of the left side 115 and right side 116. The flange 150 provides a surface to sealably mount the hood 100 to the wall 210 of the catch basin 200. The flange 150 may include one or more holes 164, as shown in the FIGS. for sealably mounting the hood 100 to the wall 210. It should be understood that any system may be used to sealably mount the hood 100 to the wall 210 of a catch basin 200. For example, cement, sealant, external fixtures, or bolts may be used to sealably mount the hood 100 to the wall 210 of the catch basin 200.

In further reference to FIG. 1B the hood wall 114 forms a prow 120 in the horizontal plane defined by the static water level 222 in the catch basin 200. Again, the static water level is the lowest point of the outlet pipe 222. In other words, the hood wall 114 forms a wedge in the horizontal plane, when the hood 100 is mounted to the wall 210. In some embodiments the prow 120 extends along a vertical axis. In reference to FIG. 1B the prow 120 extends between a bottom 124 and a top 122. In the disclosed embodiment the bottom 124 of the prow 120 is below the static water level 222, and the top 122 of the prow 120 is above the static waterline 222. In the embodiment shown the bottom 124 of the prow 120 extends to the bottom 112 of the hood wall 114, and the top 122 of the prow 120 extends to the top 118 of the hood wall 114.

In some embodiments of the present invention the prow 120 comprises a single point. For example, the hood wall 114 has a pyramid shape, wherein the point of the pyramid projects into catch basin 200 in the horizontal plane. In other embodiments of the present invention the prow 120 extends along an axis that is not parallel with the vertical axis of the catch basin 200. For example, in some embodiments the prow 120 extends along an axis and all points of the prow 120 along the axis are equidistant to a vertical wall 210 of the catch basin 200. In other embodiments the prow 120 extends along an axis and the distance between the interior wall 210 and each point along the prow 120 axis varies.

Figure 5:
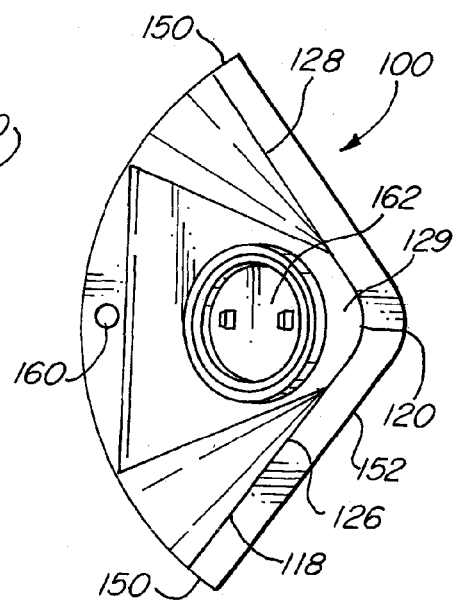
FIG. 5 is a top view of the hood shown in FIG. 1B wherein the hood is rotated 90 degrees counter clockwise about its vertical axis.
Figure 7:
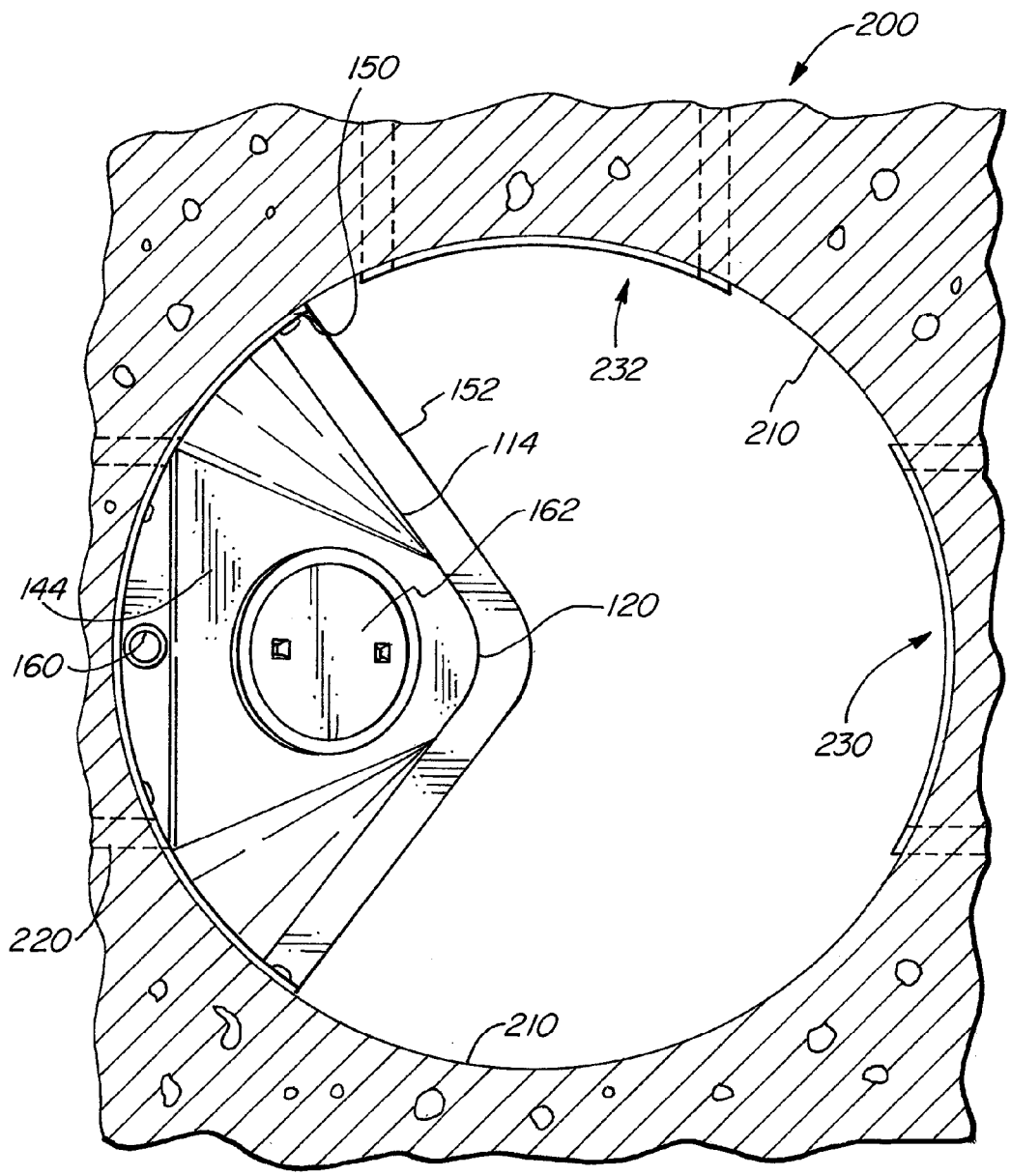
FIG. 7 is a top view of the hood shown in FIG. 6 showing a cut away view in a horizontal plane parallel to the static water level in the catch basin.

Referring to FIGS. 1B and 5, and 7 the prow 120 is formed in the center of hood wall 114 as measured along its horizontal axis. The hood wall 114 has a left panel 126 and a right panel 128. Each hood wall 114 panel 126 and 128 is a substantially flat plate that extends along the vertical axis. The left panel 126 and the right panel 128 meet along at the centerline of the hood wall 112 forming the wedge or prow 120. In other embodiments the left and right panels 126, 128 bulge outward, and in yet other embodiments the left and rights panels 126, 128 bulge inward, or have any other shape known in the art.

In reference to FIGS. 5 and 7 the intersection of the left panel 126 and the right panel 128 forms an angle beta opposite the interior wall 210, wherein beta is less than 180 degrees. In some embodiments, like that shown in FIG. 5, there is an arc transition or fillet 129 at the juncture of the left panel 126 and the right panel 128 in the cross section defined by the static water level 222. In some embodiments the fillet 129 extends along the entire prow 120. In some embodiments the transition between the left panel 126 and right panel 128 is not arc, but rather a linear transition, for example an intersection between two planes.

In reference to the embodiment disclosed in FIG. 1B the hood 100 further comprises a hood top 144. In other embodiments the hood 100 does not include a hood top 144, but rather comprises a hood wall 114 wherein either side 115, 116 of the hood wall 114 is sealably mounted to the interior wall 210 of the catch basin 200 and the top of the hood 100 is open to the ambient air in the catch basin 200. In some embodiments the hood wall 114 and the hood top 144 are formed from a single mold. In other embodiments the hood wall 114 and hood top 144 are formed from two or more molds. In the embodiment shown in FIG. 1B the bottom 148 of the hood top 144 has the same contour as the top 118 of the hood wall 114 along the horizontal axis. In the embodiment disclosed in FIG. 1B the hood wall 114 and hood top 144 are joined together along this contour to form the hood 100. In some embodiments the hood top 144 further includes the flange 150 around its perimeter. The flange 150 provides a surface to sealably mount the hood 100 to the interior wall 210. In the disclosed embodiment the hood top 144 further includes a vent 160 and an access port 162.

In other embodiments the hood is formed from a top section 510 and a bottom section 520 wherein the top section 510 and the bottom section 520 may be formed in different molds. For example, in reference to FIGS. 12-14, and FIGS. 15-17, two embodiments of the present hood is shown wherein the hood is formed from a top section and a bottom section. It should be understood that hood comprising multiple section, the juncture between the sections is not necessarily coextensive with the juncture hood wall, and the hood top. For example, in references to FIGS. 12-14, the hood wall comprises at least a portion of the bottom section 520, and the top section 510.

When the hood 100 is mounted to the interior wall 210 a hood compartment 102 is defined inside the hood 100. The hood compartment is defined by the interior wall 210, the static water level 222, the hood wall 114, and the hood top 144. To the extent the hood 100 does not include a hood top 144, an imaginary horizontal plane that intersects with the top 118 of the hood wall 114 defines the top of the hood compartment 102. The hood top 144 forms a cover over the hood compartment 102 thereby preventing wastewater from flowing over the hood wall 114 and into the hood compartment 102. It should be understood that in the embodiments that do not include a hood top 144, rising wastewater in the catch basin will reach a level when it flows over the top 118 of the hood wall 114 and into the hood compartment 102, thereby bypassing the bottom 112 barrier of the hood wall 114.

In reference to FIGS. 2-7 the prow 120 is in the center of the hood wall 114 between the left side 115 and right side 116 of the hood wall 114. In some embodiments the prow 120 is not centered in the horizontal plane between the left side 115 and right side 115 of the hood wall 114. For example the prow 120 is justified toward the left or right side of the hood wall 114. This configuration also disrupts the flow of wastewater 240 as it enters the catch basin 200 and flows around the outside of the hood wall 114, thereby overcoming problems over the prior art.

Figure 4:
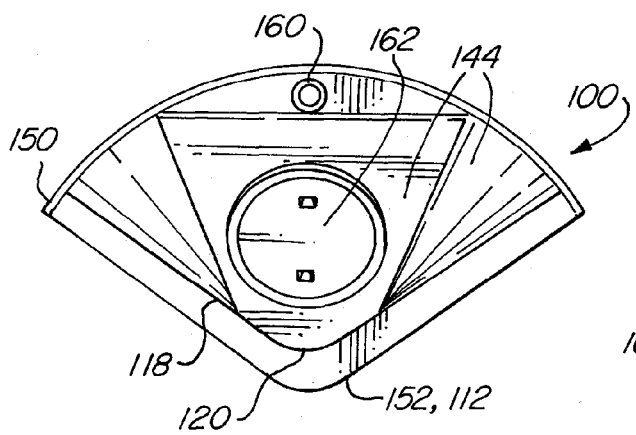
FIG. 4 is a top view of the hood shown in FIG. 1B.

In reference to FIG. 4 a top view of one embodiment of the hood 100 is shown. The prow 120 extends out from the catch basin wall 210 in the horizontal plane, similar to the bow of ship. In further reference to FIG. 2-5 the prow 120 is the portion of the hood that extends furthest from the catch basin wall 210, with the exception of the splitter 152 at the bottom 112 of the hood wall 114. As wastewater 240 flows into the catch basin 200 and into the hood wall 114, the prow 120 creates a bi-lateral flow path in the wastewater that is forced to flow to either the left 115 or right side 116 of the hood wall 114. The increased length of flow decreases energy, thereby increasing the precipitation or particulate suspended in the wastewater 240. After the particulate is precipitated from the wastewater flow 240 it sinks to the bottom of the catch basin 200, also referred to as the sump 228, for later collection.

In reference to FIG. 7 a top cross section view of a circular catch basin 200 is shown wherein one embodiment of the inventive hood 100 is sealably mounted to the curved interior wall 210 of the catch basin 200. The circular catch basin 200 has an outlet pipe 220, represented by dash lines. The hood 100 is mounted to the interior wall 210 of the catch basin 200 over the outlet pipe 220. In addition the circular catch basin 200 includes a first inlet pipe 230 and a second inlet pipe 232. The first inlet pipe 230, shown with dashed lines, is directly opposite the outlet pipe 220 in the catch basin 200. The second inlet pipe 232, also shown with dashed lines, is perpendicular to the first inlet pipe 232 and the outlet pipe 220. It should be understood that there are many possible configurations for the inlet and outlet flow of a catch basin 200.

Figure 6:
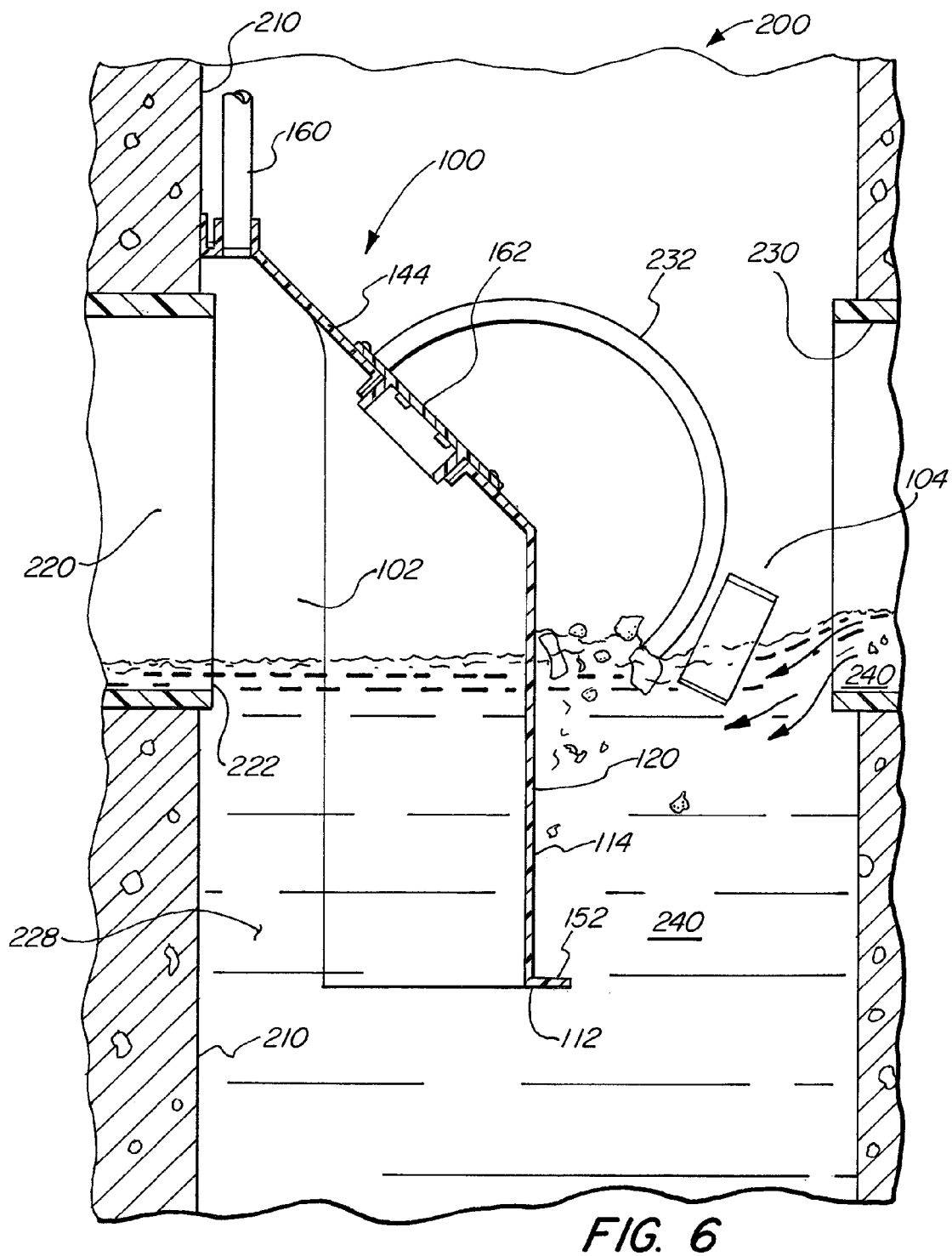
FIG. 6 is a side view of the hood shown in FIG. 1B wherein the hood is sealably mounted to the wall of a catch basin.

In reference to FIG. 6, a vertical cross section of the circular catch basin 200 of FIG. 7 is shown. In this catch basin 200, the first inlet pipe 230 enters catch basin 200 at the same vertical level as the outlet pipe 220. In some embodiments the first inlet pipe 230 and/or the second inlet pipe 232 are above the outlet pipe 220 thereby preventing wastewater from backing up in the inlet pipes 230 and 232. The prow 120 extends toward the middle of the catch basin in the horizontal plane as shown in FIGS. 6 and 7. In some embodiments it is preferred that the prow extends to a center point of the catch basin in a cross section plane defined by the static waterline. This is preferred because it provides sufficient room inside the hood compartment to allow the hood to accommodate different size outlets, while also providing sufficient room outside the hood compartment for pollutants to collect on the surface of the wastewater. The prow 120 further extends along a vertical axis from the top of the hood wall 118 to the bottom of the hood wall 112. The bottom of the hood wall 112 is substantially below that static water level 222 in the catch basin 200. In the embodiment shown in FIG. 6 the splitter extends along the entire length of the bottom 112 of the hood wall 114.

As wastewater 240 enters the catch basin 200 from the inlet pipe 230 substantially opposite the hood wall 114 it flows directly toward the prow 120 of the hood 100. The prow 120 forms a hydraulic wedge in the wastewater 240 around the prow 120. In some embodiments the first inlet pipe 230 is substantially above the hood 100, and wastewater falls onto the prow 120, thereby driving the hydraulic wedge deeper into the wastewater 240 collected in the catch basin 200. The hydraulic wedge induces additional precipitation of particulate as discussed above. Moreover, the prow 120 induces a flow in the wastewater around the bottom 112 of the hood wall 114. As discussed above, this flow jettisons floatables and causes the precipitation of certain particulate. In addition, the flow reduces ice formation in around the bottom 112 of the hood wall 114. This is advantageous because ice that forms in and around the bottom 112 of the hood wall 114 may prevent the hood 100 from functioning properly by restricting the flow of wastewater 240. The increased bi-lateral flow makes it more difficult for ice to form.

In further reference to FIGS. 6 and 7, the prow 120 prevents ice blocks that flow into the catch basin 200 from damaging the hood 100 and/or the catch basin structure. During colder months and in colder climates it is common for large ice flows and ice blocks to form in wastewater systems. Typically the ice will increase in size throughout the winter. As the temperature increases in the spring the ice will inevitably melt, and flow down the system and into a catch basin 200. Ice flow poses a significant risk to infrastructure, especially in wastewater systems with substantial elevation change. For example, in a system with a large elevation change, the ice flow could fall or slide into a catch basin under the force of gravity at a high rate of speed and collide with the hood. The momentum of the ice flow could dismount the hood 100, crack the hood 100, or block the flow of wastewater 240 in the catch basin 200.

In the case of a massive destructive ice flow, the prow 120 acts as an ice breaker. As the ice flows into the catch basin 100 it collides with the prow 120 and is spilt apart. The prow 120 further protects the hood 100 and catch basin 200 from damage, and prevents ice from clogging the catch basin 100. The shape of the hood wall 114 increases the structural strength of hood 100 and allows it to withstand increased forces and collisions with ice flows. The increased strength is especially applicable in circular catch basins, wherein the sides 114, 116 of the hood wall 114 are substantially perpendicular to the catch basin wall 210, as shown in FIGS. 7 and 8.

Figure 8:
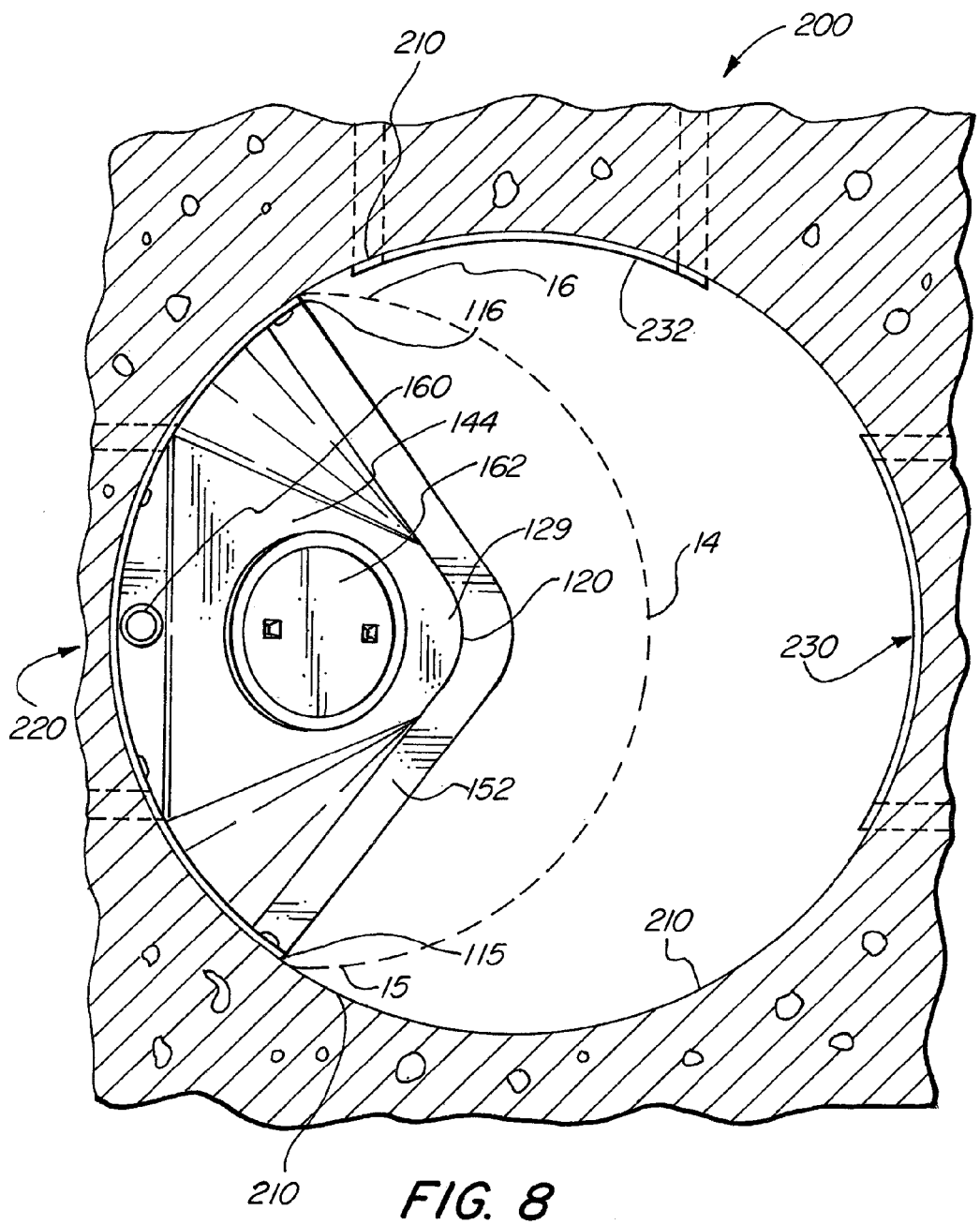
FIG. 8 is a top view of the hood shown in FIG. 6 showing a cut away view in a horizontal plane parallel to the static water level in the catch basin.

In reference to FIG. 8, a horizontal cross section of a hood 100 mounted to the wall 210 of circular catch basin 200 is shown. The dashed line 14 in FIG. 8 represents the outline of a prior art hood wall 14. As is evident from FIG. 8, the prior art hood wall 14 extends much further into the horizontal plane of the catch basin 200. In reference to the left 115 and right 116 sides of the novel hood wall 114, the angle between the interior wall 210 of the catch basin 200 and the outer side of the hood wall 115, 116 is substantially ninety degrees. This configuration provides room to access the flange 150 and sealably mount the hood 100 to the interior wall 210 of a circular catch basin 200. In addition, as discussed above, this perpendicular configuration increases the strength of the hood 100, and the integrity of its seal.

However, in reference to the outline of the prior art hood wall 14 the angle between the interior wall 210 of the catch basin 200 and the outer side of the hood wall 15, 16 is substantially less than ninety degrees. This configuration does not provide sufficient space to sealably mount the hood wall 14 to the interior catch basin wall 210. The prow 120 of the inventive hood wall 114 combined with the left and right panels 126, 128 provides additional space between the sides 115, 116 of the hood wall 114 and the interior catch basin wall 210.

FIG. 8 further illustrates that with the novel hood 100 the ratio of the area of the surface water inside the hood compartment 102 to the area of the surface water outside the hood compartment 104 is substantially less than the known hood 10. The prow 120 hood 100 results in a hood compartment 102 having a smaller area as measured at the static water level. This in turn results in much larger surface area outside the hood compartment 104. This effect is especially true in catch basins having a circular cross section as shown in FIG. 8. The increased area outside of the hood compartment 104 provides additional area relative to the diameter of the catch basin 200 for oil and other floatables to collect. In addition, the increased area greatly improves flow characteristics in and around the bottom 112 of the hood 100. In addition, the increased area outside the hood compartment 104 is better adapted to allow ice flow to pass through the catch basin, and to allow at least some ice formation in the catch basin 200 without substantially degrading the ability of the hood 100 to prevent pollutants from flowing into the outlet 220. Finally the additional space outside the hood compartment allows personnel to more easily enter the catch basin for maintenance.

In some embodiments of the present invention, the inventive hood 100 is preinstalled in a catch basin 200 before that catch basin 200 is installed in the ground and integrated into a wastewater collection system. For example, in some embodiments the catch basin 200 has a circular cross section. The catch basin 200 may comprise a plastic, PVC, or any other known material that can be used to manufacture a catch basin off site. The catch basin further includes openings in its interior walls for joining outlet and inlet pipes to the catch basin 200 once it is installed. In addition, a hood 100 is preinstalled in the catch basin 200. The combination catch basin 200 and hood 100 is shipped to the work site, where the combination is installed into an existing wastewater collection system. This configuration significantly reduces installation costs.

In reference to FIGS. 9-11, a novel screen apparatus 500 is shown for use with a hood 300 installed to the wall 410 of a catch basin 400. In some embodiments the screen 500 is used as standalone apparatus in a catch basin 400. In other embodiments the screen 500 is used in combination with the novel hood 100 having a prow 120 in its front wall 114, or in combination with a known hood 10. The screen 500 is adapted to be installed to the catch basin wall 410 so that a least a portion of the wastewater 440 flowing through the catch basin 400 and into the outlet 430 passes through the screen apparatus 500, thereby preventing floatables from entering the outlet pipe 420.

In reference to FIG. 9 the screen comprises a screen wall 514 that extends along an axis. The screen wall 514 has a left side 515 and a right side 516. In reference to the embodiment shown in FIG. 11, the screen wall 514 has a curved shaped in a horizontal cross section. The left side 515 and right side 516 are adapted to be fixed to the interior wall 410 of the catch basin 400. For example, in some embodiments the left side 515 and the right side 516, include a flange that extends along at least a portion of the side and provides a surface to mount the screen 500 to the wall 410.

In some embodiments the top of the screen wall 514 is above the bottom 312 of the hood wall 314 when the screen 500 is installed to the wall of the catch basin. For example, in the embodiments disclosed in FIGS. 9-10 the top of the screen wall 514 extends above the bottom of the hood 312. The bottom 512 of the screen wall 514 extends below the bottom 412 of the hood wall 314. In some embodiments the distance that the screen wall 514 extends above the hood bottom 312 is approximately five times the distance the screen wall 514 extends below the hood bottom 312.

In reference to FIG. 9, the screen wall 514 comprises a mesh or a screen that allows wastewater 440 to freely pass through, but prevents larger size floatables from passing through, for example cans, paper, and other floatables. In some embodiments the screen wall 514 may comprise a mesh having ¼ inch openings. In other embodiments, the screen wall 514 may comprises a mesh having 2 inch openings. In yet other embodiments the screen wall 514 may comprise one or more sheets of metal, wherein the sheet metal includes a plurality of perforations thereby allowing wastewater 440 to flow through. In some embodiments the screen 500 is manufactured from plastic, being rigid or flexible. In further embodiments, the perimeter of the screen apparatus 500, or a least a portion thereof, is reinforced to increase the strength of the structure, especially as it is subject to great forces as the flow rate increases in the catch basin 400.

Referring to FIG. 11, the disclosed screen 500 does not include a bottom or a top, rather it is open, thereby allowing wastewater and some non-floatable pollutants to pass through. For example, wastewater 440 flows under the bottom 512 of the screen wall 514. In some embodiments the screen apparatus 500 includes a screen bottom. In reference to FIG. 11, the screen apparatus 500 further does not include a screen top. This facilitates installation in and around the hood 300, and also serves to release excess wastewater 440 in the case where the screen becomes clogged and wastewater 440 collects in the catch basin 400. As the wastewater 440 rises above the highest level of the screen it flows over the screen wall 514. It should be understood that in some embodiments the screen 500 may include a bottom, and or a top. It should be further understood that in some embodiments the screen 500 may have varying mesh size, designed to filter pollutants commonly found at a particular location.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. An apparatus for mounting around an outlet of a catch basin having an inlet and an outlet, comprising:
   a hood wall partially sealingly fitted around the outlet of an interior wall of the catch basin so as to define at least a partially sealable compartment therewith that is open to the outlet and extends below the outlet, the hood being angled to form a wedge in a cross-section plane being substantially defined by a static water level in the catch basin;
   wherein an apex of the wedge is positioned in an unobstructed flow path of an inlet of the catch basin.

2. The apparatus of claim 1, wherein said wedge extends along an axis below said static water level.

3. The apparatus of claim 1, wherein said wedge extends along an axis above said static water level.

4. The apparatus of claim 3, wherein at least a portion of the hood wall is partially sealing fitted on the interior wall between an upper portion of said outlet and a top of the catch basin.

5. The apparatus of claim 4, wherein at least a portion of said interior wall is curved in said cross section plane being substantially defined by said static water level in said catch basin.

6. The apparatus of claim 1, wherein said hood wall is shaped such that a plurality of hoods can nest together in a form fitting configuration prior to installation.

7. The apparatus of claim 1, said hood wall further comprising a splitter, said splitter extending from a least a portion of said hood wall.

8. The apparatus of claim 1, wherein said apex of said wedge comprises a fillet transition in said cross section plane.

9. An apparatus for facilitating the precipitation of pollutants in waste water, comprising:
   a catch basin having an inlet an outlet, the outlet being positioned in an interior wall of the catch basin;
   a hood partially sealingly mounted around said outlet of an interior wall of said catch basin;
   wherein at least a portion said hood wall forms a wedge in a cross section plane being substantially defined by a static water level in said catch basin; and
   wherein an apex of the wedge is positioned in an unobstructed flow path of an inlet of the catch basin.

10. The apparatus of claim 9, wherein said wedge extends along an axis above and below said static water level.

11. The apparatus of claim 10, wherein said hood further comprises a first panel and a second panel, said first and second panel being substantially planar; and
    said first panel being joined to second panel at said apex to form said wedge.

12. The apparatus of claim 11, wherein said apex comprises a fillet transition.

13. The apparatus of claim 11, further comprising a vent to provide air communication between an inside of said hood compartment and an outside of said hood compartment.

14. The apparatus of claim 10, further comprising a hood top, wherein said hood top is secured to hood wall so as to form a hood compartment.

15. The apparatus of claim 9, wherein said hood is formed from a plurality of molds, thereby facilitating manufacture and shipping.

16. The apparatus of claim 9, wherein said hood wall is shaped to partially sealingly fit around the outlet of an interior wall of the catch basin, wherein at least a portion of said interior wall is circular in said cross section plane.

17. The apparatus of claim 9, wherein said hood wall is shaped to partially sealingly fit around the outlet of an interior wall of the catch basin, wherein at least a portion of said interior wall is flat in said cross section.

18. The apparatus of claim 9, said hood wall further comprising a splitter, said splitter extending from a least a portion of said hood wall.

19. The apparatus of claim 9, wherein a least a portion of the hood wall is partially sealing fitted on the interior wall between an upper portion of said outlet and a top of the catch basin.

* * * * *